United States Patent
Lee et al.

(10) Patent No.: US 7,552,934 B2
(45) Date of Patent: Jun. 30, 2009

(54) PEDALING VEHICLE HAVING EXERCISING FUNCTION

(75) Inventors: Chin-Fa Lee, Taichung (TW); Yu-Shan Lee, Taichung (TW)

(73) Assignee: Chi-Hsiang Chen, Changhua County, Sihu Township (TW)

( * ) Notice: Subject to any disclaimer, the term of this patent is extended or adjusted under 35 U.S.C. 154(b) by 359 days.

(21) Appl. No.: 11/504,802

(22) Filed: Aug. 15, 2006

(65) Prior Publication Data

US 2007/0235975 A1    Oct. 11, 2007

(30) Foreign Application Priority Data

Apr. 4, 2006    (TW) ............................... 95205677 U (51) Int. Cl.
*B62K 3/00* (2006.01)
*B62K 19/00* (2006.01)

(52) U.S. Cl. .................... 280/266; 280/267; 280/282
(58) Field of Classification Search ................. 280/266, 280/267, 281, 282

See application file for complete search history.

(56) References Cited

U.S. PATENT DOCUMENTS

| | | | | |
|---|---|---|---|---|
| 3,669,468 A * | 6/1972 | Rich | ........................... | 280/267 |
| 3,960,392 A * | 6/1976 | Read | ........................... | 280/282 |
| D251,264 S * | 3/1979 | Cook et al. | ................. | D12/112 |
| 4,497,502 A * | 2/1985 | Forbes et al. | ................. | 280/282 |
| 4,572,535 A * | 2/1986 | Stewart et al. | ............... | 280/282 |
| 5,568,935 A * | 10/1996 | Mason | ........................ | 280/282 |
| 5,853,184 A * | 12/1998 | Lofgren et al. | ............ | 280/242.1 |
| 6,402,174 B1* | 6/2002 | Maurer | ........................ | 280/267 |
| 6,581,947 B2* | 6/2003 | Andrews et al. | ............. | 280/266 |
| D493,391 S * | 7/2004 | Gunter | ....................... | D12/112 |
| 7,188,853 B2* | 3/2007 | Yen | ........................... | 280/288.1 |

* cited by examiner

*Primary Examiner*—Paul N Dickson
*Assistant Examiner*—Marc A Scharich
(74) *Attorney, Agent, or Firm*—CKC & Partners Co., Ltd.

(57) ABSTRACT

A pedalling vehicle includes a main body, two control handles, two drive links, and a transmission link. The main body includes a front frame a front wheel, a rear frame, two rotation devices, two rear wheels, two cranks, and two connecting members. The rotation devices are connected by the transmission link through connection of the connecting members so that the rotation devices are rotatable synchronously and the rear wheels are movable with the rotation devices synchronously. Thus, the two rear wheels are turned synchronously by connection of the transmission link so as to turn and change the travel direction of the pedalling vehicle exactly.

18 Claims, 8 Drawing Sheets

PEDALING VEHICLE HAVING EXERCISING FUNCTION

BACKGROUND OF THE INVENTION

1. Field of the Invention

The present invention relates to a pedalling vehicle and, more particularly, to a pedalling vehicle having an exercising function to exercise a user's two arms and feet.

2. Description of the Related Art

A conventional pedalling vehicle comprises a main body having a front portion provided with a front wheel, a mediate portion provided with a pedal unit, and a rear portion provided with a rear wheel. Thus, when the user steps the pedal unit, the front wheel is moved forward, and the rear wheel is moved forward with the front wheel to move the pedalling vehicle forward. However, only the user's two feet are exercised by stepping the pedal unit, so that the user's two arms are not trained, thereby limiting the versatility of the pedalling vehicle.

BRIEF SUMMARY OF THE INVENTION

In accordance with the present invention, there is provided a pedalling vehicle, comprising a main body including a front frame having a first end provided with a front wheel and a pedal unit, a rear frame having a first end connected with a second end of the front frame, two opposite rotation devices each rotatably mounted on a second end of the rear frame, two rear wheels each mounted on the respective rotation device to rotate therewith, two cranks each having a first end mounted on the respective rotation device to rotate the respective rotation device, and two connecting members each having a first end mounted on the respective rotation device to rotate therewith; two opposite control handles each pivotally mounted on the rear frame of the main body; two opposite drive links each having a first end connected to and driven by the respective control handle and a second end connected to a second end of the respective crank of the main body 10 to drive the respective crank; and a transmission link having two opposite ends each connected to a second end of the respective connecting member of the main body so that the rotation devices are rotatable synchronously and the rear wheels are movable with the respective rotation devices synchronously.

The primary objective of the present invention is to provide a pedalling vehicle having an exercising function to exercise a user's two arms and feet.

Another objective of the present invention is to provide a pedalling vehicle, wherein the user can operate the pedalling vehicle to push or pull the control handles by his two hands and to step the pedal unit by his two feet, thereby achieving a body exercising effect.

A further objective of the present invention is to provide a pedalling vehicle, wherein the rear wheels are turned synchronously by connection of the transmission link so as to turn and change the travel direction of the pedalling vehicle exactly.

A further objective of the present invention is to provide a pedalling vehicle, wherein the cranks are stopped by the limit bars when the pedalling vehicle is turned to prevent the rear wheels from being turned excessively, thereby preventing the main body from being jammed with the rear wheels, and thereby preventing the pedalling vehicle from falling down.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a pedalling vehicle in accordance with the preferred embodiment of the present invention comprises a main body 10 including a front frame 11 having a first end provided with a front wheel 30 and a pedal unit 40, a rear frame 12 having a first end connected with a second end of the front frame 11, two opposite rotation devices 101 each rotatably mounted on a second end of the rear frame 12, two rear wheels 70 each mounted on the respective rotation device 101 to rotate therewith, two cranks 102 each having a first end mounted on the respective rotation device 101 to rotate the respective rotation device 101, two connecting members 103 each having a first end mounted on the respective rotation device 101 to rotate therewith, and a threaded adjusting knob 20 mounted between the front frame 11 and the rear frame 12 to adjust a relative position between the front frame 11 and the rear frame 12.

The pedalling vehicle further comprises two opposite control handles 52 each pivotally mounted on the rear frame 12 of the main body 10, a support tube 50 mounted on the rear frame 12 of the main body 10 to support the two control handles 52, two opposite drive links 60 each having a first end connected to and driven by the respective control handle 52 and a second end connected to a second end of the respective crank 102 of the main body 10 to drive the respective crank 102, a transmission link 61 having two opposite ends each connected to a second end of the respective connecting member 103 of the main body 10 so that the rotation devices 101 are rotatable synchronously and the rear wheels 70 are movable with the respective rotation devices 101 synchronously.

The support tube 50 has a mediate portion mounted on a bottom of the first end of the rear frame 12 of the main body 10. The pedalling vehicle further comprises a support rod 51 mounted in the support tube 50 and having two opposite threaded ends 511, and two hollow mounting members 521 each mounted on the respective end 511 of the support rod 51 by a screw member 512. Each of the two control handles 52 is pivotally mounted on the respective mounting member 521 and has a pivot portion 522 pivotally connected to the first end of the respective drive link 60.

The front frame 11 of the main body 10 has a substantially Y-shaped cross-sectional profile. The front wheel 30 of the front frame 11 is covered by a front fender 31. The rear frame 12 of the main body 10 has a substantially T-shaped cross-sectional profile. Each of the rear wheels 70 of the rear frame 12 is covered by a rear fender 71.

The pedalling vehicle further comprises a seat 80 mounted on the second end of the rear frame 12 and located between the two rear wheels 70, and a brake unit 90 mounted between the front wheel 30 of the front frame 11 and one of the two control handles 52 to provide a braking effect to the front wheel 30 of the front frame 11.

Figure 1:
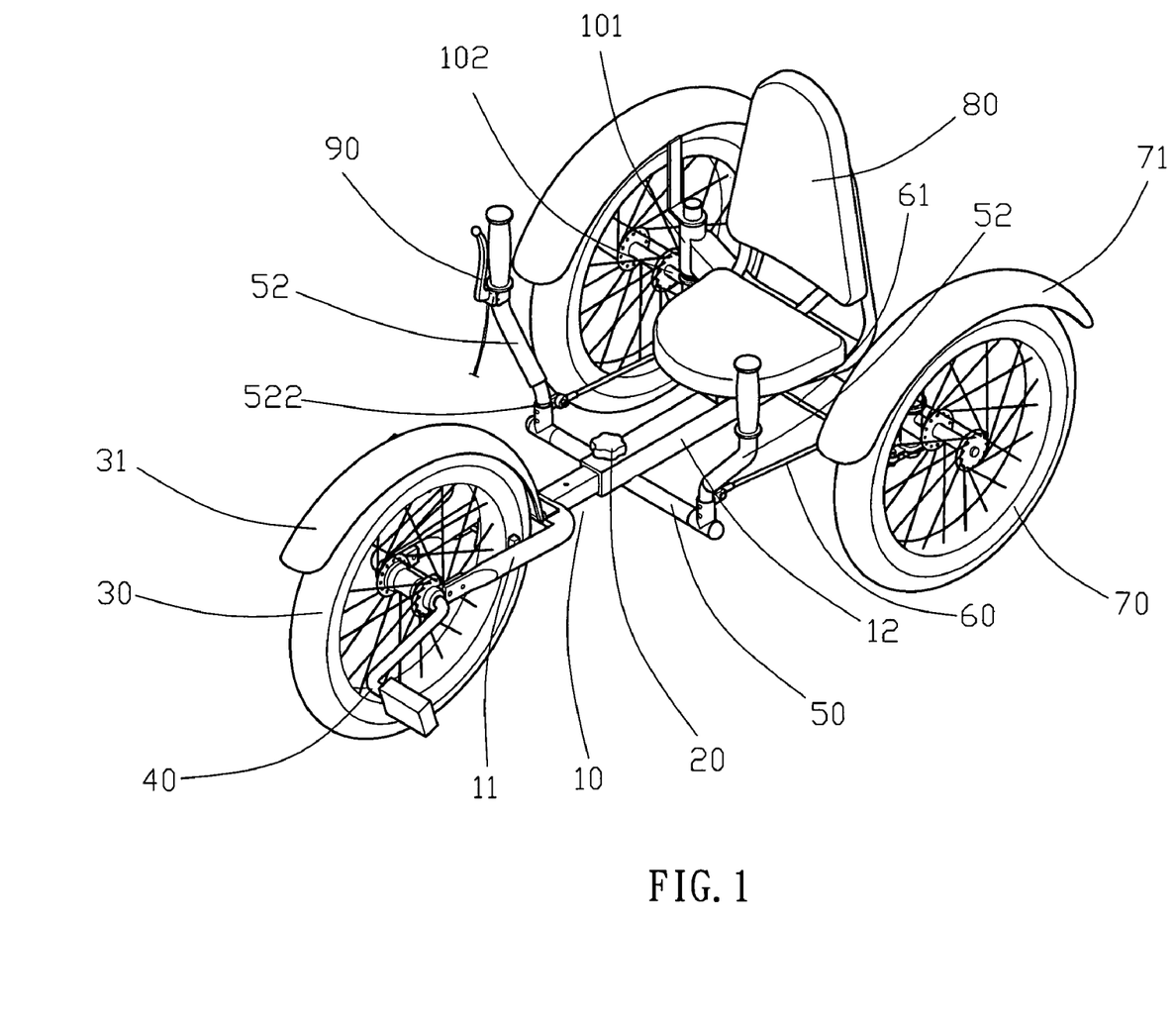
FIG. 1 is a perspective view of a pedalling vehicle in accordance with the preferred embodiment of the present invention.
Figure 2:
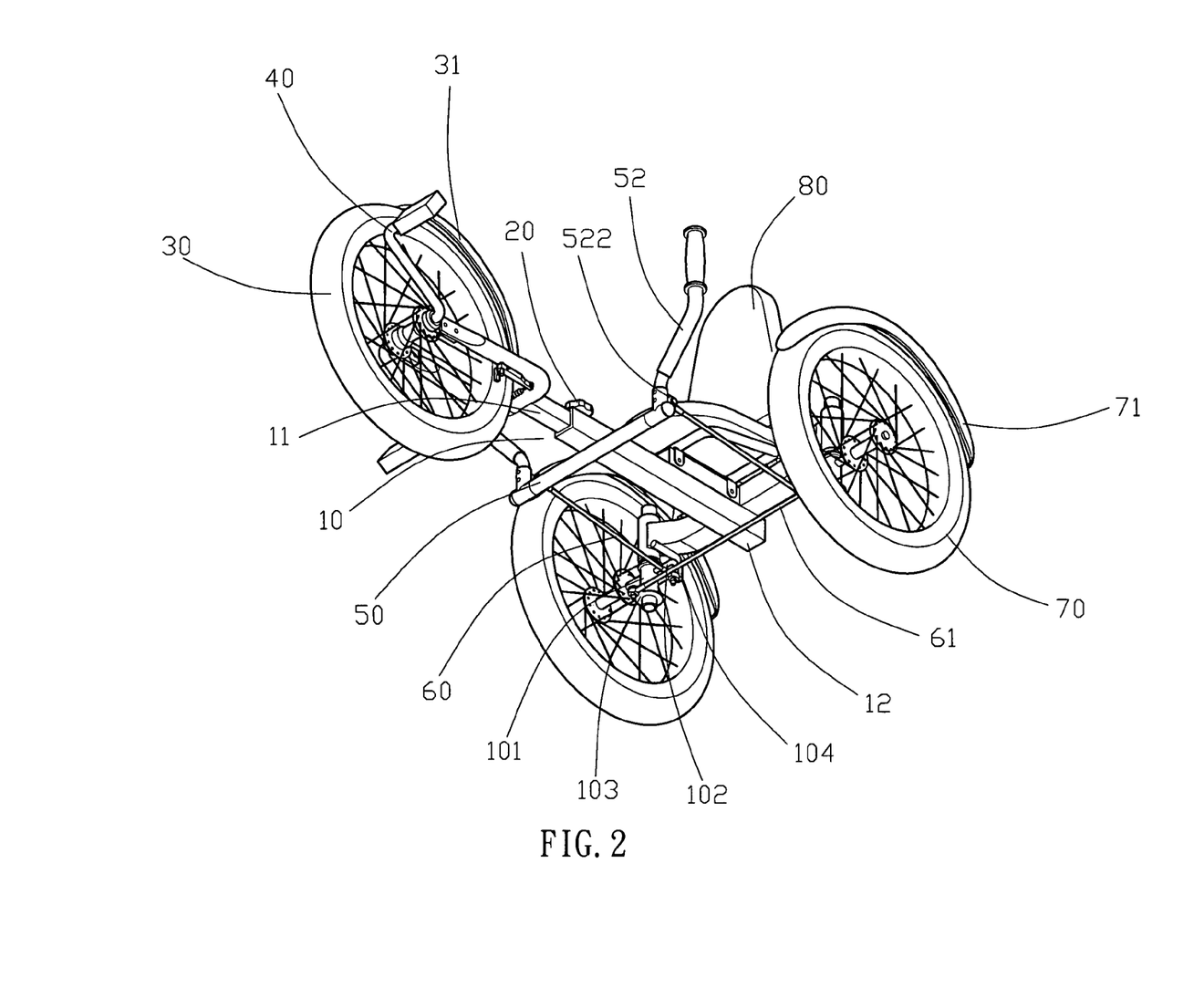
FIG. 2 is a bottom perspective view of the pedalling vehicle as shown in FIG. 1.
Figure 3:
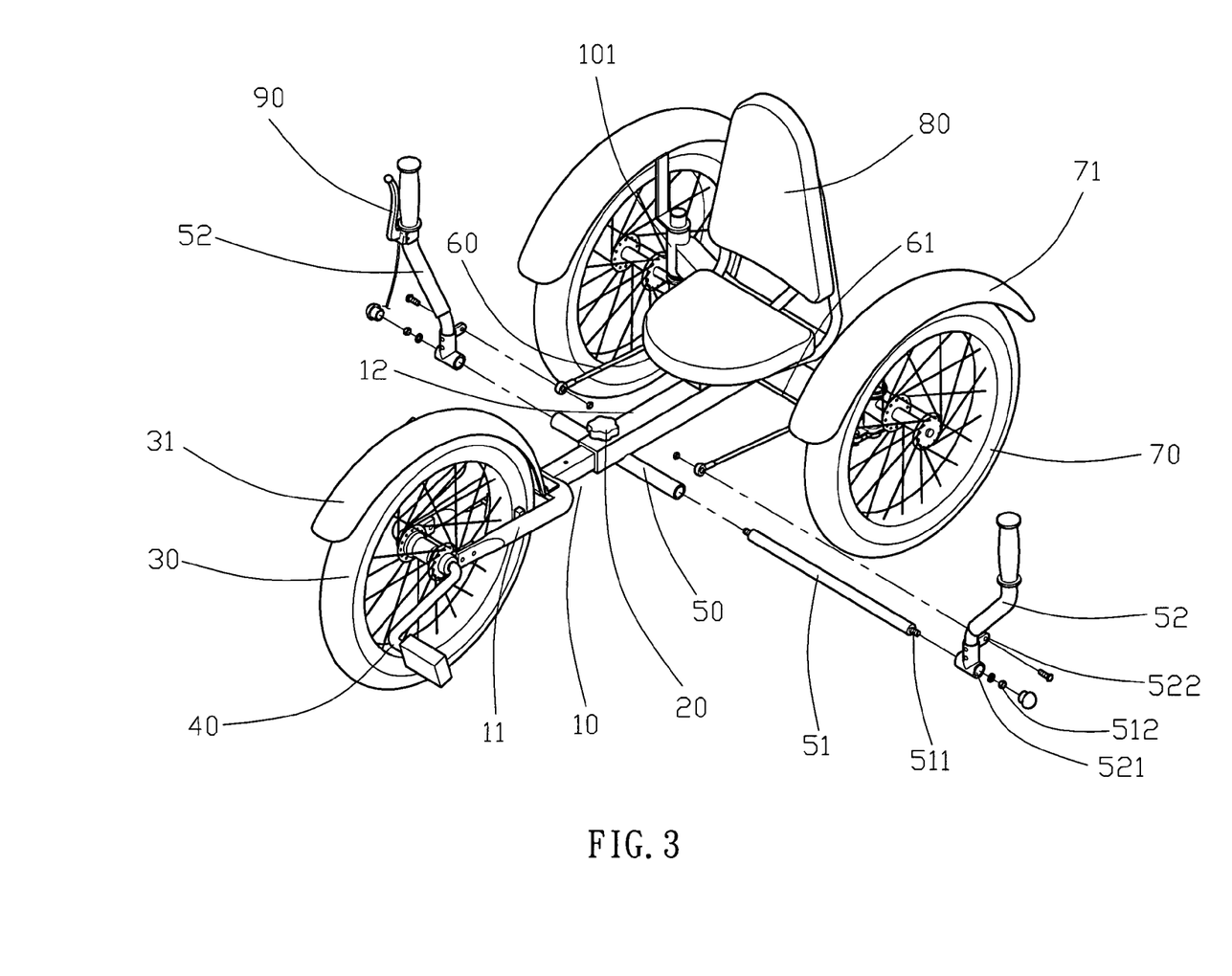
FIG. 3 is a partially exploded perspective view of the pedalling vehicle as shown in FIG. 1.
Figure 4:
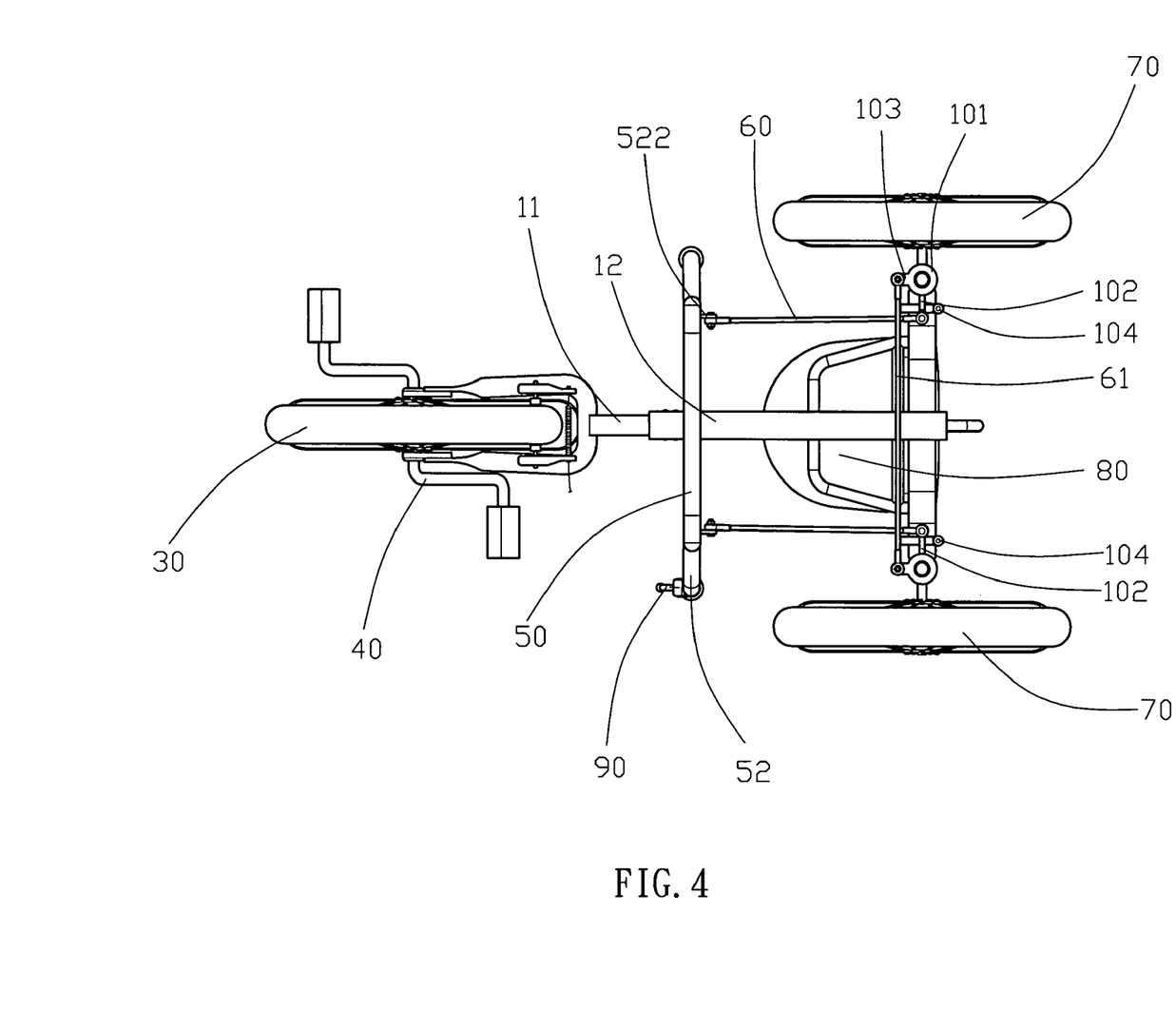
FIG. 4 is a bottom plan view of the pedalling vehicle as shown in FIG. 1.
Figure 5:
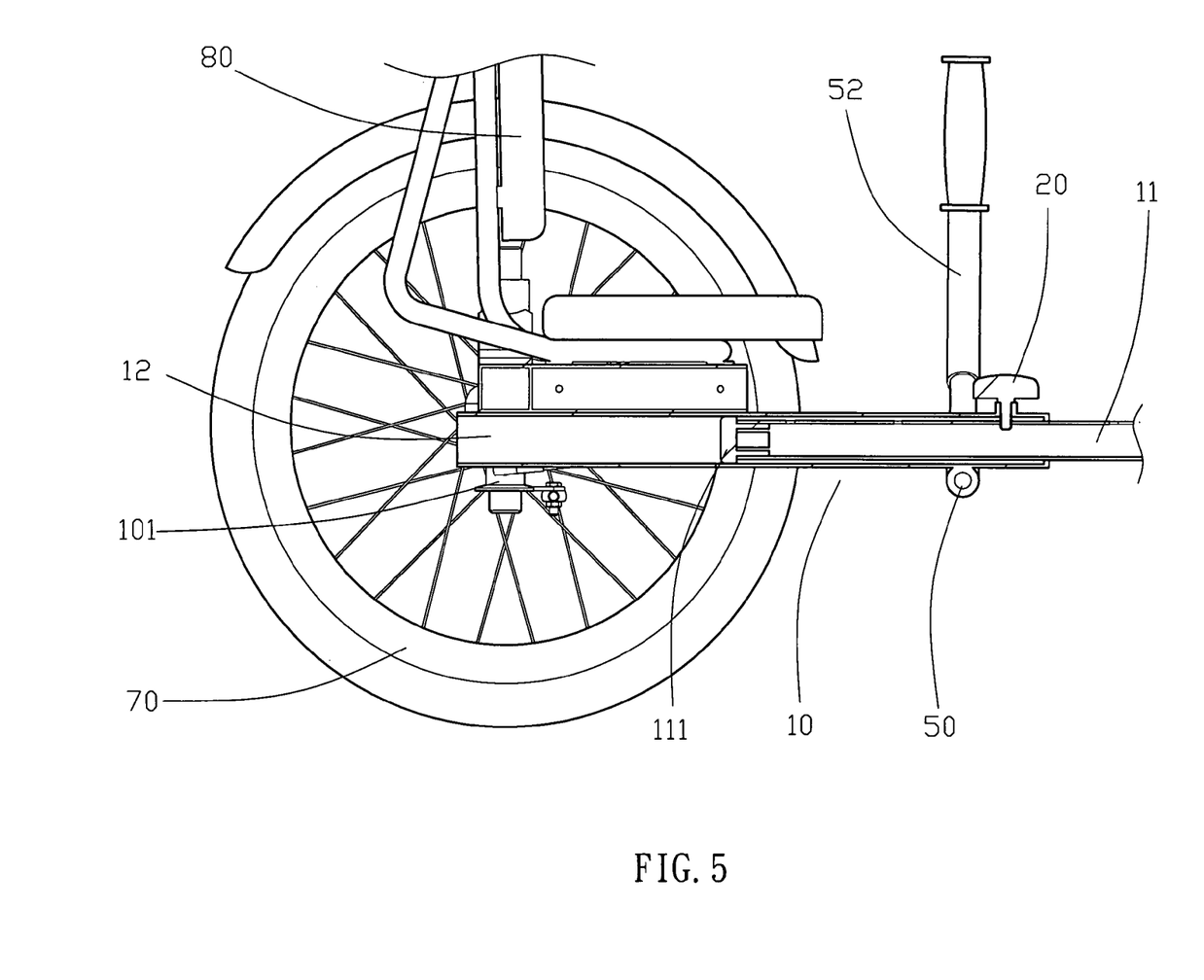
FIG. 5 is a locally enlarged plan cross-sectional view of the pedalling vehicle as shown in FIG. 1.
Figure 6:
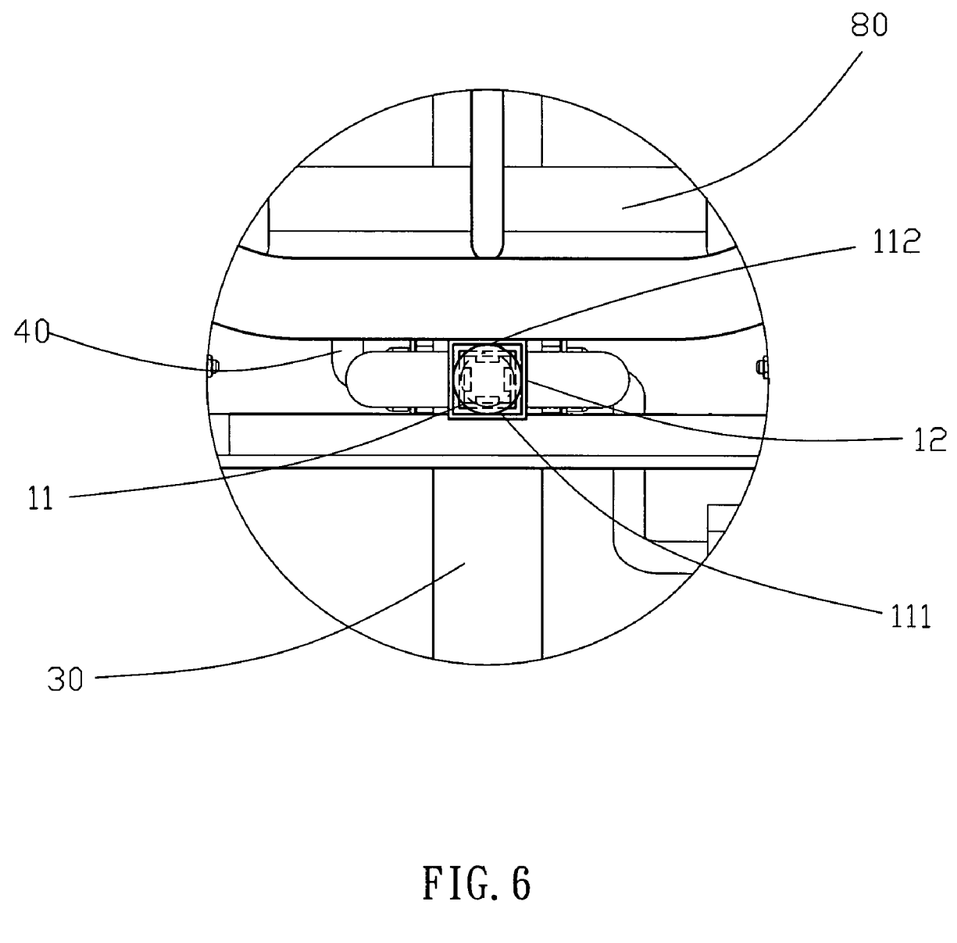
FIG. 6 is a locally enlarged plan cross-sectional view of the pedalling vehicle as shown in FIG. 1.

As shown in FIGS. 5 and 6, the main body 10 further includes a positioning block 111 mounted in the second end of the front frame 11 and inserted into the first end of the rear frame 12. The first end of the rear frame 12 has a substantially square cross-sectional profile, and the positioning block 111 has a substantially circular cross-sectional profile. Thus, the positioning block 111 and the first end of the rear frame 12 have four tangent contact points 112 so that the front frame 11 is mounted in the rear frame 12 rigidly and stably without producing vibration.

Figure 7:
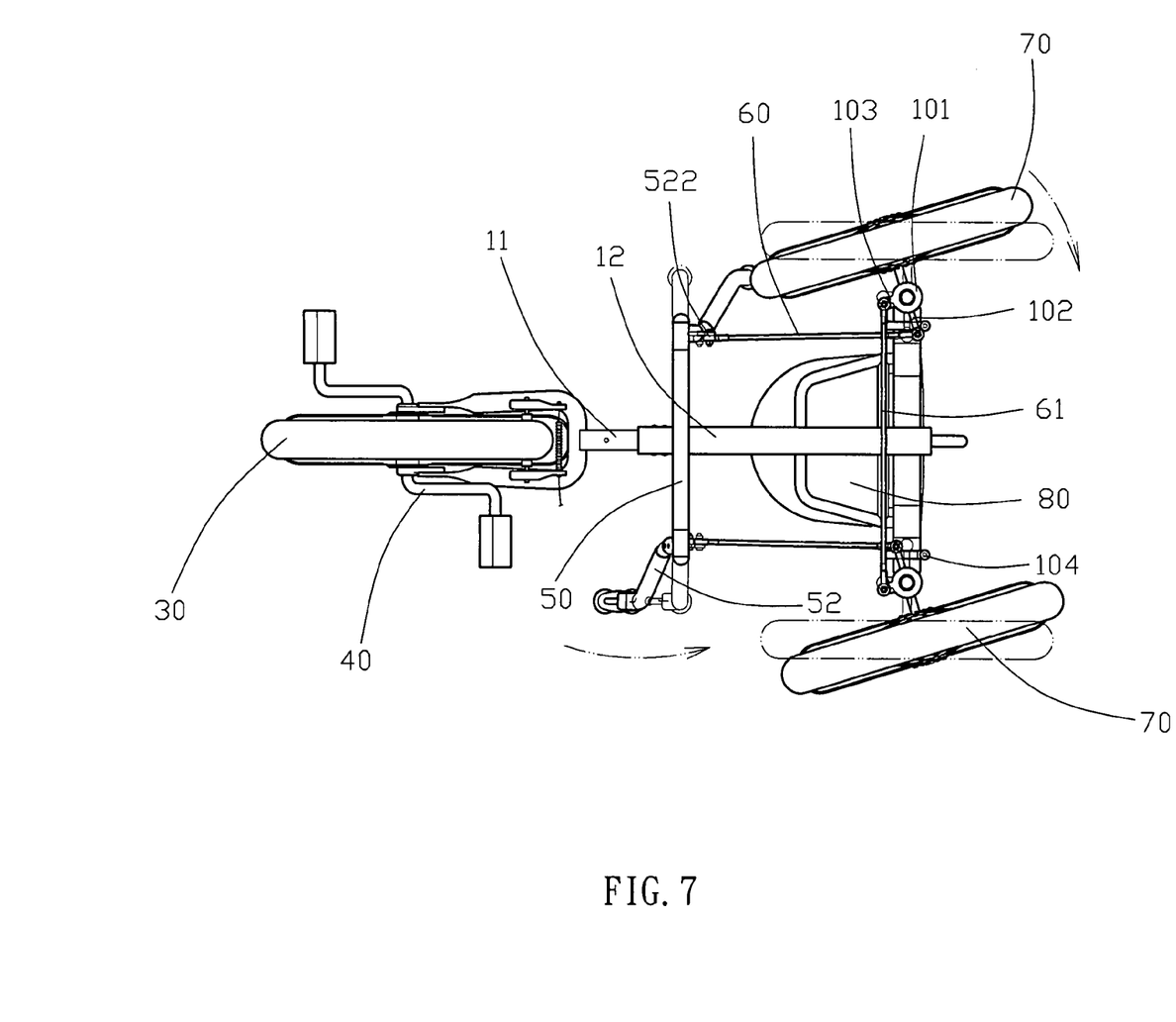
FIG. 7 is a schematic operational view of the pedalling vehicle as shown in FIG. 4.

In operation, referring to FIGS. 1-7, when the user wishes to change the travel direction of the pedalling vehicle, one of the two control handles 52 is pushed forward to move the respective drive link 60 forward which moves the respective crank 102 which rotates the respective rotation device 101 so as to turn the respective rear wheel 70. At this time, the rotation devices 101 are connected by the transmission link 61 through connection of the connecting members 103 so that the rotation devices 101 are rotatable synchronously and the rear wheels 70 are movable with the rotation devices 101 synchronously. Thus, the rear wheels 70 are turned synchronously as shown in FIG. 7 by connection of the transmission link 61 so as to turn and change the travel direction of the pedalling vehicle exactly.

Figure 8:
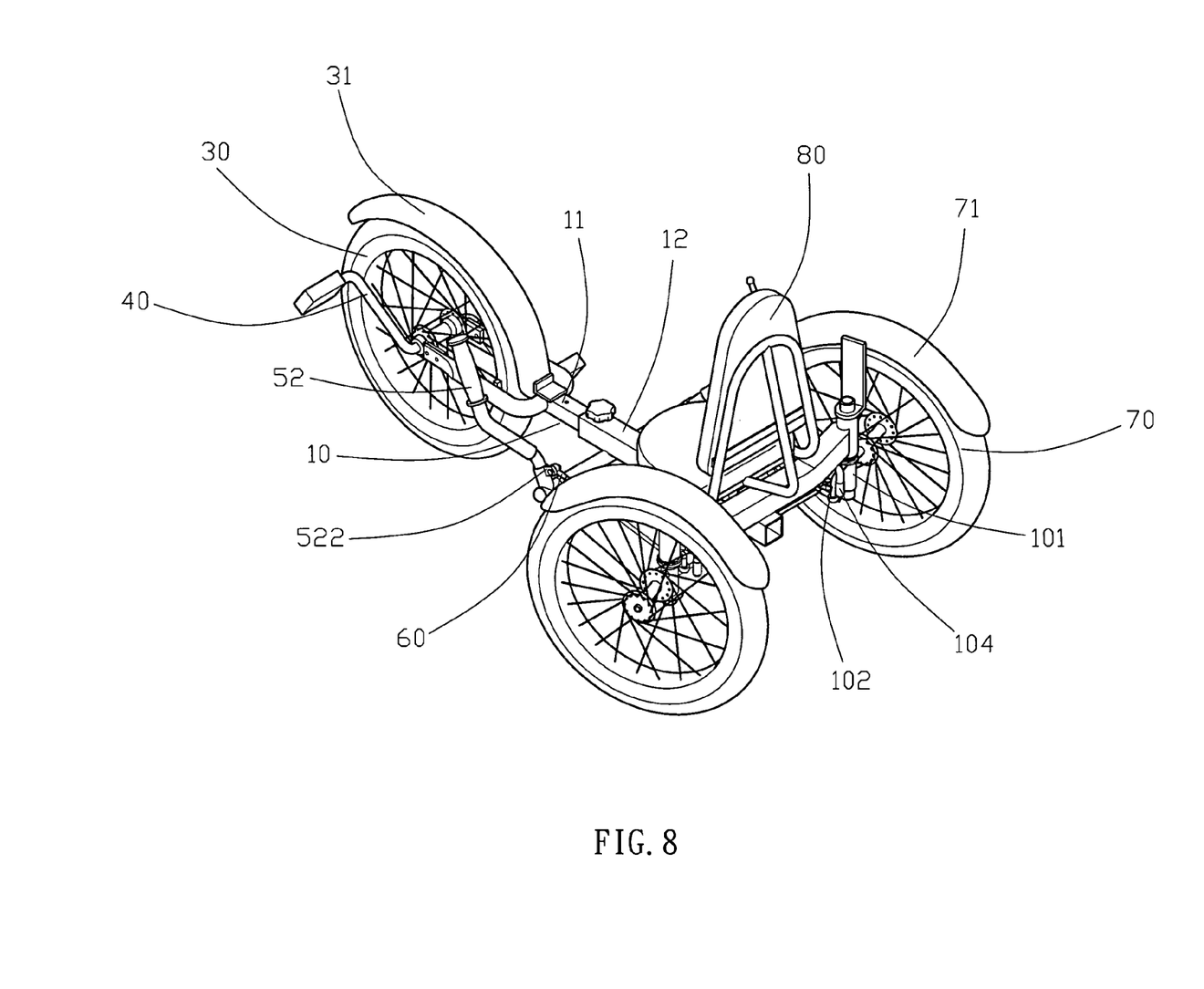
FIG. 8 is a rear perspective view of the pedalling vehicle as shown in FIG. 1.

Referring to FIG. 8 with reference to FIGS. 1-7, the main body 10 further includes two substantially L-shaped limit bars 104 each mounted on the second end of the rear frame 12 and each located beside the respective crank 102 to limit a further movement of the respective crank 102. Thus, the cranks 102 are stopped by the limit bars 104 when the pedalling vehicle is turned to prevent the rear wheels 70 from being turned excessively, thereby preventing the main body 10 from being jammed with the rear wheels 70, and thereby preventing the pedalling vehicle from falling down.

Accordingly, the user can operate the pedalling vehicle to push or pull the control handles 52 by his two hands and to step the pedal unit 40 by his two feet, thereby achieving a body exercising effect. In addition, the rear wheels 70 are turned synchronously by connection of the transmission link 61 so as to turn and change the travel direction of the pedalling vehicle exactly. Further, the cranks 102 are stopped by the limit bars 104 when the pedalling vehicle is turned to prevent the rear wheels 70 from being turned excessively, thereby preventing the main body 10 from being jammed with the rear wheels 70, and thereby preventing the pedalling vehicle from falling down.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A pedalling vehicle, comprising:
   a main body including a front frame having a first end provided with a front wheel and a pedal unit, a rear frame having a first end adjustably and detachably connected with a second end of the front frame, two opposite rotation devices each rotatably mounted on a second end of the rear frame, two rear wheels each mounted on the respective rotation device to rotate with the respective rotation device, two cranks each having a first end mounted on the respective rotation device to rotate the respective rotation device to turn the respective rear wheel, and two connecting members each having a first end mounted on the respective rotation device to rotate with the respective rotation device;
   two opposite control handles each pivotally mounted on and movable relative to the rear frame of the main body;
   two opposite drive links each having a first end connected to and driven by the respective control handle and a second end connected to a second end of the respective crank of the main body to drive the respective crank, wherein each of the two control handles drives the respective drive link which drives the respective crank which rotates the respective rotation device which turns the respective rear wheel; and
   a transmission link having two opposite ends each connected to a second end of the respective connecting member of the main body so that the rotation devices are rotatable synchronously and the rear wheels are able to turn with the respective rotation devices synchronously.

2. The pedalling vehicle in accordance with claim 1, further comprising a support tube mounted on the rear frame of the main body to support the two control handles.

3. The pedalling vehicle in accordance with claim 2, wherein the support tube is perpendicular to the rear frame of the main body and has a mediate portion mounted on a bottom of the first end of the rear frame of the main body 4. The pedalling vehicle in accordance with claim 2, further comprising a support rod mounted in the support tube and having two opposite ends each protruding outwardly from the support tube, and two hollow mounting members each mounted on the respective end of the support rod, wherein each of the two control handles is pivotally mounted on the respective mounting member and is pivotable relative to the front frame and the rear frame of the main body.

5. The pedalling vehicle in accordance with claim 1, wherein each of the two control handles has a pivot portion pivotally connected to the first end of the respective drive link to move the respective drive link by pivoting movement of each of the two control handles relative to the rear frame of the main body.

6. The pedalling vehicle in accordance with claim 1, wherein the front frame of the main body has a substantially Y-shaped cross-sectional profile.

7. The pedalling vehicle in accordance with claim 1, wherein the front wheel of the front frame is covered by a front fender.

8. The pedalling vehicle in accordance with claim 1, wherein the rear frame of the main body has a substantially T-shaped cross-sectional profile.

9. The pedalling vehicle in accordance with claim 1, wherein each of the rear wheels of the rear frame is covered by a rear fender.

10. The pedalling vehicle in accordance with claim 1, further comprising a seat mounted on the second end of the rear frame and located between the two rear wheels, wherein the seat is secured on the rear frame of the main body and non-movable relative to the rear frame and the two rear wheels of the main body.

11. The pedalling vehicle in accordance with claim 1, further comprising a brake unit mounted between the front wheel of the front frame and one of the two control handles to provide a braking effect to the front wheel of the front frame.

12. The pedalling vehicle in accordance with claim 1, wherein the main body further includes a positioning block mounted in the second end of the front frame and inserted into and detachably locked in the first end of the rear frame.

13. The pedalling vehicle in accordance with claim 12, wherein the first end of the rear frame has a substantially square cross-sectional profile, and the positioning block has a substantially circular cross-sectional profile.

14. The pedalling vehicle in accordance with claim 13, wherein the positioning block and the first end of the rear frame have four tangent contact points so that the front frame is mounted in the rear frame evenly and smoothly without producing vibration.

15. The pedalling vehicle in accordance with claim 1, further comprising a threaded adjusting knob adjustably and detachably mounted between the front frame and the rear frame to adjust a relative position between the front frame and the rear frame, wherein the front frame is movable relative to the rear frame when the threaded adjusting knob is detachable from the front frame and the rear frame.

16. The pedalling vehicle in accordance with claim 1, wherein the rear wheels are turned synchronously by connection of the transmission link.

17. The pedalling vehicle in accordance with claim 1, wherein the main body further includes two limit bars each mounted on the second end of the rear frame and each located beside the respective crank to limit a further movement of the respective crank.

18. The pedalling vehicle in accordance with claim 17, wherein each of the limit bars is substantially L-shaped.

* * * * *